US008258759B2

(12) United States Patent
Yin et al.

(10) Patent No.: US 8,258,759 B2
(45) Date of Patent: Sep. 4, 2012

(54) ANTI-ISLANDING FOR GRID-TIE INVERTER USING COVARIANCE ESTIMATION AND LOGIC DECISION MAKER

(75) Inventors: Jun Yin, Livermore, CA (US);
Chi-Sheng Fan, Santa Clara, CA (US);
Djordje Garabandic, Burnaby (CA)

(73) Assignee: Xantrex Technology Inc., Livermore, CA (US)

( * ) Notice: Subject to any disclaimer, the term of this patent is extended or adjusted under 35 U.S.C. 154(b) by 416 days.

(21) Appl. No.: 12/699,652

(22) Filed: Feb. 3, 2010

(65) Prior Publication Data

US 2011/0187200 A1  Aug. 4, 2011

(51) Int. Cl.
*H02P 11/00* (2006.01)
*H02P 9/00* (2006.01)
*H02H 7/06* (2006.01)

(52) U.S. Cl. ............... 322/19; 322/20; 322/44; 307/47; 330/124 R; 330/2; 363/98; 375/297; 455/127.1; 455/127.3

(58) Field of Classification Search .................. 322/19, 322/20, 44; 307/47; 330/2, 124 R; 363/98; 375/297; 455/127.1, 127.3
See application file for complete search history.

(56) References Cited

U.S. PATENT DOCUMENTS

| 4,507,724 | A | * | 3/1985 | Glennon ........................... 363/98 |
| 4,704,673 | A | * | 11/1987 | Busch .............................. 363/98 |
| 4,828,389 | A | * | 5/1989 | Gubbins et al. ................ 356/462 |
| 5,157,461 | A | * | 10/1992 | Page .............................. 356/462 |
| 5,262,843 | A | * | 11/1993 | Sugarbaker et al. ........... 356/464 |
| 5,274,542 | A | * | 12/1993 | Tanaka et al. .................... 363/96 |
| 5,625,539 | A | * | 4/1997 | Nakata et al. .................... 363/17 |
| 5,990,734 | A | * | 11/1999 | Wright et al. ...................... 330/2 |
| 5,990,738 | A | * | 11/1999 | Wright et al. ................... 330/149 |
| 6,054,894 | A | * | 4/2000 | Wright et al. ................... 330/149 |
| 6,313,703 | B1 | * | 11/2001 | Wright et al. ................... 330/149 |
| 6,753,665 | B2 | * | 6/2004 | Ueda et al. ..................... 318/135 |
| 6,801,442 | B2 | * | 10/2004 | Suzui et al. ...................... 363/55 |
| 6,838,925 | B1 | * | 1/2005 | Nielsen .......................... 327/391 |

(Continued)

FOREIGN PATENT DOCUMENTS

EP     1764894 A1     3/2007

OTHER PUBLICATIONS

International Search Report corresponding to co-pending International Patent Application Serial No. PCT/US2011/023100, European Patent Office, dated Feb. 29, 2012; (5 pages).

(Continued)

*Primary Examiner* — Pedro J Cuevas
(74) *Attorney, Agent, or Firm* — Nixon Peabody LLP

(57) ABSTRACT

An anti-islanding implementation that introduces a small, continuously varying phase shift pattern in the output current of an inverter. In grid-connected mode, this phase shift pattern has no impact on the frequency of the inverter's output voltage. However, when islanded, the phase shift will cause the voltage frequency to deviate from nominal. Changes in the output current phase thus correlate well with the voltage frequency, so a covariance index is used to detect an islanding configuration. When this index exceeds a threshold, a larger phase shift pattern is introduced in the output current, large enough to cause the voltage frequency to fall outside the inverter's trip protection window without compromising the inverter's power quality yet ensuring reliable tripping of the inverter.

20 Claims, 5 Drawing Sheets

U.S. PATENT DOCUMENTS

| | | | | |
|---|---|---|---|---|
| 7,105,772 | B2 * | 9/2006 | Houston et al. | 219/130.51 |
| 7,126,409 | B2 * | 10/2006 | Nielsen | 327/391 |
| 7,184,723 | B2 * | 2/2007 | Sorrells et al. | 455/127.3 |
| 7,225,087 | B1 | 5/2007 | Siciliano et al. | 702/58 |
| 7,233,129 | B2 * | 6/2007 | Erdman et al. | 322/17 |
| 7,327,803 | B2 * | 2/2008 | Sorrells et al. | 375/294 |
| 7,339,355 | B2 * | 3/2008 | Erdman et al. | 322/29 |
| 7,414,469 | B2 * | 8/2008 | Sorrells et al. | 330/124 R |
| 7,421,036 | B2 * | 9/2008 | Sorrells et al. | 375/294 |
| 7,432,686 | B2 * | 10/2008 | Erdman et al. | 322/44 |
| 7,466,760 | B2 * | 12/2008 | Sorrells et al. | 375/294 |
| 7,526,261 | B2 * | 4/2009 | Sorrells et al. | 455/127.3 |
| 7,535,120 | B2 * | 5/2009 | Erdman et al. | 307/47 |
| 7,598,632 | B2 * | 10/2009 | Fishman et al. | 307/140 |
| 7,620,129 | B2 * | 11/2009 | Sorrells et al. | 375/341 |
| 7,639,072 | B2 * | 12/2009 | Sorrells et al. | 330/2 |
| 7,647,030 | B2 * | 1/2010 | Sorrells et al. | 455/127.1 |
| 7,660,139 | B2 * | 2/2010 | Garabandic | 363/98 |
| 7,672,650 | B2 * | 3/2010 | Sorrells et al. | 455/127.3 |
| 7,750,733 | B2 * | 7/2010 | Sorrells et al. | 330/124 R |
| 7,822,147 | B2 * | 10/2010 | Huang et al. | 375/296 |
| 7,835,709 | B2 * | 11/2010 | Sorrells et al. | 455/127.3 |
| 7,844,235 | B2 * | 11/2010 | Sorrells et al. | 455/127.3 |
| 7,945,224 | B2 * | 5/2011 | Sorrells et al. | 455/127.1 |
| 8,026,764 | B2 * | 9/2011 | Sorrells et al. | 330/124 R |
| 8,031,804 | B2 * | 10/2011 | Sorrells et al. | 375/297 |
| 8,036,306 | B2 * | 10/2011 | Sorrells et al. | 375/297 |
| 8,050,353 | B2 * | 11/2011 | Sorrells et al. | 375/297 |
| 8,059,749 | B2 * | 11/2011 | Sorrells et al. | 375/297 |
| 2003/0147191 | A1 | 8/2003 | Deng et al. | 361/62 |
| 2003/0164691 | A1 * | 9/2003 | Ueda et al. | 318/135 |
| 2003/0218888 | A1 * | 11/2003 | Suzui et al. | 363/34 |
| 2004/0232129 | A1 * | 11/2004 | Houston et al. | 219/130.51 |
| 2005/0105314 | A1 * | 5/2005 | Nielsen | 363/132 |
| 2005/0122083 | A1 * | 6/2005 | Erdman et al. | 322/20 |
| 2007/0187955 | A1 * | 8/2007 | Erdman et al. | 290/44 |
| 2007/0247876 | A1 * | 10/2007 | Garabandic | 363/17 |
| 2008/0007121 | A1 * | 1/2008 | Erdman et al. | 307/47 |
| 2008/0018309 | A1 * | 1/2008 | Erdman et al. | 322/20 |
| 2008/0246336 | A1 * | 10/2008 | Fishman et al. | 307/31 |
| 2009/0117865 | A1 * | 5/2009 | Vinayak et al. | 455/127.1 |
| 2011/0026281 | A1 * | 2/2011 | Chapman et al. | 363/65 |
| 2011/0115301 | A1 * | 5/2011 | Bhavaraju et al. | 307/86 |
| 2012/0087159 | A1 * | 4/2012 | Chapman et al. | 363/41 |
| 2012/0087165 | A1 * | 4/2012 | Esram et al. | 363/97 |

OTHER PUBLICATIONS

International Written Opinion corresponding to co-pending International Patent Application Serial No. PCT/US2011/023100, European Patent Office, dated Feb. 29, 2012; (8 pages).

Yin et al: "A New Adaptive Logic Phase-Shift Algorithm for Anti-Islanding Protections in Inverter-Based DG Systems" dated Jan. 1, 2005; (5 pages).

Fangrui Liu et al: "An Active Islanding Detection Method for Grid-Connected Converters" dated Jun. 3, 2008; (4 pages).

Schneider Electric, Xantrex™ GT100, GT250, GT500 Utility Scale Commercial; We're not just providing power. We're redefining sustainable energy; (2 pages) dated Oct. 31, 2008.

Jun Yin, Chris Diduch, IEEE, Liuchen Chang, Senior Member, IEEE; A New Hybrid Anti-Islanding Algorithm in Grid Connected Three-Phase Inverter System; (9 pages); dated Mar. 28, 2006.

* cited by examiner

ANTI-ISLANDING FOR GRID-TIE INVERTER USING COVARIANCE ESTIMATION AND LOGIC DECISION MAKER

FIELD OF THE INVENTION

The present disclosure pertains generally to distributed generation systems, and, more particularly, to an anti-islanding algorithm for a grid-tie inverter using covariance estimation.

BACKGROUND

Under certain local load conditions, a grid-tie inverter in a distributed generation (DG) system can maintain sustainable output power at a sustainable voltage and frequency when it is suddenly disconnected from the main grid, creating an islanding condition. Operating the inverter in an islanding condition can pose a safety hazard to service personnel and cause damage to the power system. Both the Institute of Electrical and Electronics Engineers (IEEE) Standard 1547 and Underwriters Laboratories (UL) 1741 require the inverter to be shut down within two seconds once it is islanded from the main grid.

There are generally two types of anti-islanding techniques: passive and active. Passive techniques use information available at the inverter side to detect islanding while active techniques introduce external perturbations at the output of the inverter to detect and trip islanding.

An existing active technique involves using a phase shift algorithm to move the inverter's frequency into the Over Frequency Protection/Under Frequency Protection (OFP/UFP) trip window. The phase shift algorithm can repeatedly introduce phase shifts in sequential cycles of alternating current (AC), such as 0 degrees for 30 AC cycles, +6 degrees in one AC cycle, +12 degrees in one AC cycle, +6 degrees in one AC cycle, 0 degrees in one AC cycle, −6 degrees in one AC cycle, −12 degrees in one AC cycle, −6 degrees in one AC cycle. These phase shifts can be as large as 12 degrees and have an adverse impact on the inverter's output power and voltage at the point of common coupling (PCC).

Another existing active technique modifies the phase shift loop into a more aggressive loop to meet the anti-islanding requirements per IEEE Standard 1547, such as 0 degrees in 30 AC cycles, +6 degrees in two AC cycles, +12 degrees in two AC cycles, +6 degrees in two AC cycles, 0 degrees in one AC cycle, −6 degrees in two AC cycles, −12 degrees in two AC cycles, and −6 degrees in two AC cycles. An adverse consequence of this modified technique is that even higher power and voltage swing are introduced to the inverter's output, further downgrading the power quality and efficiency of the inverter.

BRIEF SUMMARY

An inverter is used to convert electrical energy from, for example, solar panels or wind power generators, into an alternating current (AC) waveform that household appliances and other electrical loads use. Grid-tie inverters, which are part of a distributed generation (DG) system in electric power system, convert and deliver power from multiple sources (in this example, from the solar panels and from the wind farms) to the electrical grid. However, when there is a power failure, such as caused by a lightning strike, the electrical connection to the electrical grid can be severed, interrupting the flow of power from inverter to the main electrical grid. But the inverter can still be receiving energy from the solar panels or wind farms and converting and delivering it to the local loads, which poses a safety hazard because there is no awareness that all power lines and loads at the disconnection point at the inverter side can still be alive. An inverter operating in this configuration is said to be islanded from the electrical grid.

Jurisdictions throughout the world have thus adopted codes and standards that require inverters to turn themselves off in an islanding configuration, shortly after detection of a loss of utility connection (typically within 2 seconds). This auto-disconnect feature is referred to as anti-islanding, in which the inverter automatically detects an islanding condition and quickly acts to disconnect itself from the grid by mechanically or electrically disabling its power bridge that feeds power to the local load. This disclosure proposes an anti-islanding approach that continuously monitors for an islanding condition and disconnects the inverter from the local load upon detecting an islanding condition without adversely affecting the inverter's power quality and ensuring reliable tripping by the inverter following an islanding event.

To do so, a pattern of small perturbations to the phase is introduced in the output current of the inverter. In grid-connected mode, when the inverter is connected to the electrical grid, these perturbations will not affect the frequency of the output voltage, because the grid frequency is independent of the phase of the output current of the inverter in grid-connected mode. However, in islanding mode, when the inverter loses its connection to the electrical grid, changes to the phase of the output current will cause the frequency of the output voltage to deviate from nominal (typically 50 or 60 Hz). A covariance index is used to correlate the phase shift with the voltage frequency. In an islanding configuration, this covariance index will rise sharply as the phase shifts almost immediately begin to cause voltage frequency deviation. When the covariance index exceeds a predefined threshold, a larger phase shift pattern is introduced in the output current, one that is large enough to guarantee that the inverter will trip. Codes and standards define the over frequency protection (OFP) and under frequency protection (UFP) window for inverters, and the larger phase shift is selected to cause the voltage frequency to fall outside the OFP/UFP window.

The foregoing and additional aspects and implementations of the present disclosure will be apparent to those of ordinary skill in the art in view of the detailed description of various implementations and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
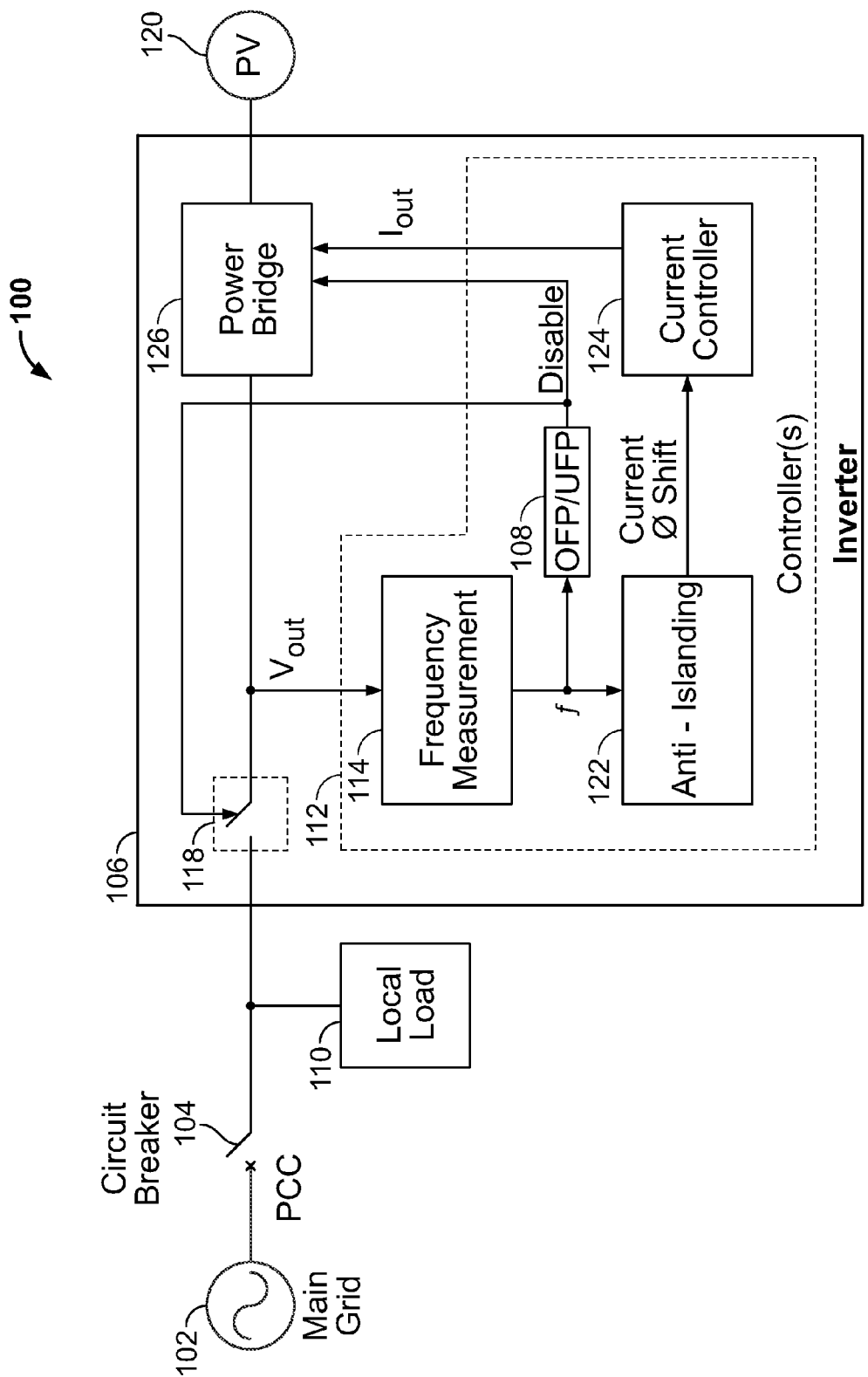
FIG. 1 is a functional block diagram of a distributed generation system that includes an anti-islanding system for disconnecting the inverter following detection of an islanding condition.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure covers all modifications, equivalents, and alternatives falling within the spirit and scope of the invention as defined by the appended claims.

DETAILED DESCRIPTION

Referring initially to FIG. 1, a grid-connected distribution generation (DG) system 100 is shown connected at a point of common connection (PCC) to a main electrical grid 102 via one or more circuit breakers 104. The DG system 100 includes an inverter 106 connected to a local load 110. The inverter 106 includes one or more controllers 112, which includes (a) a frequency measurement module (or frequency detector) 114, (b) an anti-islanding algorithm 122, and (c) a current controller 124, and a contactor 118 that electrically and/or mechanically disconnects a power bridge 126 from the load 110. The inverter 106 can be based on, for example, a GT500 kW-MV inverter available from Xantrex.

As is known, the DG system 100 can be in one of various configurations: a grid-connected configuration, an islanding configuration, or an anti-islanding configuration. In the grid-connected configuration, the circuit breaker 104 and the contactor 118 are closed, connecting the inverter 106 to the electrical grid 102, allowing the load 110 to be powered from the electrical grid 102 and/or from the inverter 106, which can receive energy from photovoltaic (PV) panels 120 or a generator, for example. In the islanding configuration, the electrical grid 102 does not supply any power to the inverter 106 due to a fault on the grid, but the contactor 118 is closed, allowing the inverter 106 to source current to the load 110 even during a loss of power from the electrical grid 102. During this brief islanding condition, the inverter 106 can source current to the load 110, posing a safety hazard along the conductors to the load 110. Finally, in the anti-islanding configuration, which is shown in FIG. 1, the electrical grid 102 does not supply power to the DG system 100, and the inverter 106 is disconnected from the electrical grid 102.

In the frequency measurement module 114, the frequency, f, of the output voltage ($V_{out}$) of the inverter 106 is measured and provided to the anti-islanding algorithm 122, which outputs a current phase shift value to the current controller 124 that controls the power bridge 126 of the inverter 106. The frequency measurement module 114, anti-islanding algorithm 122, and current controller 124 can be controlled by one or more controllers 112 in the inverter 106. The power bridge manages and negotiates power delivery to the local (i.e., downstream from the grid 102) load 110 from the electrical grid 102 and from one or more PV panels 120 (or a generator or other type of grid-independent power source). The current controller 124 can be programmed under control of the anti-islanding algorithm 122 to introduce a shift in the phase of the output current of the inverter 106.

An OFP/UFP detection module 108 detects whether the frequency of the output voltage exceeds the OFP value or falls below the UFP value, and if so, sends a disable instruction to the power bridge 126, disabling the power bridge and opening the contactor 118, thereby disconnecting the inverter 106 from the load 110.

To represent a worst-case scenario in the islanding configuration, the load 110 can be an islanding load, which is typically a parallel resonant load modeled with a resistor component R, an inductor component L, and a capacitor component C. An ideal islanding case would occur if the resonant load 110 has its resonant frequency at the line frequency, such as 50 Hz or 60 Hz, and the output power of the inverter 106 matches the real power consumption of the islanding load 110. In the frequency domain the transfer function of the islanded system can be expressed as:

$$H(j\omega) = V(j\omega)/I(j\omega) = \frac{1}{\frac{1}{R} + j\omega C + \frac{1}{j\omega L}} \quad (1)$$

The grid-tie inverter 106 synchronizes its output current, $I_{out}$, to the output voltage, $V_{out}$, of the inverter 106 at the PCC to the electrical grid 102. In the islanding configuration, a small perturbation of phase in the output current $I_{out}$ of the inverter 106 can force the frequency of the output voltage $V_{out}$ of the inverter 106 to deviate from the islanding frequency (which, in this worst-case scenario, is the resonant frequency of the islanding load). The phase shifts in output current are highly correlated to the frequency deviation of the output voltage based on frequency response of the islanding system.

The frequency measurement module 114 detects the frequency of the output voltage $V_{out}$ of the inverter 106. The frequency measurement module 114 outputs the output voltage frequency to the anti-islanding algorithm 122, which shifts the phase of the output current $I_{out}$ of the inverter 106. The frequency measurement module 114, the anti-islanding algorithm or module 122, and the current controller 124 can be realized in hardware or software (including firmware) or any combination thereof. When realized as software, the frequency measurement module 114, the anti-islanding algorithm 122, and the current controller 124 are stored in a tangible form of machine-readable instructions executed by the one or more controllers 112, such as on an electronic memory device or a tangible computer-readable medium such as a hard disk drive. The frequency measurement module 114, the anti-islanding algorithm 122, and the current controller 124 can be considered as software modules or software functions. When realized as hardware, the frequency measurement module or detector 114, the anti-islanding module 122, and the current controller 124 include logic and control circuitry, which can be realized as one or more integrated circuit (IC) chips, together with discrete electronic components such as resistors, capacitors, oscillators, transistor-based devices such as diodes and transistors, and inductors.

In brief, an implementation of the present disclosure involves the following set of actions or steps. The anti-islanding algorithm 122 instructs the current controller 124 to introduce a first phase shift in the output current $I_{out}$ of the inverter 106. The anti-islanding algorithm 122 calculates a covariance (or more generally, calculate any correlation function) between the phase shift of the output current $I_{out}$ and a frequency of the output voltage $V_{out}$ of the inverter 106. If the covariance exceeds a predefined threshold, the anti-islanding algorithm instructs the current controller 124 to introduce a second phase shift that is larger or greater than the first phase shift in the output current $I_{out}$ of the inverter 106. The frequency detector or frequency measurement module 114 detects a deviation in the output voltage frequency in response to the introduction of the second phase shift in the output current $I_{out}$. In response to the OFP/UFP module 108 determining that the output voltage frequency falls outside of an over frequency protection window (OFP) or an under frequency protection window (UFP) of the inverter, the OFP/UFP module 108 instructs the contactor 118 to disconnect the inverter 106 from the load 110 such that $I_{out}$ goes to zero. For example, the inverter 106 can cause the power bridge 126 to be electrically and/or mechanically disconnected from its connection to the local load 110.

The first and second phase shifts are produced by a continuous function, such as a sinusoidal function, operating on the phase of the output current. A continuous function, as opposed to a discontinuous function, is desired to reduce distortions on the electrical grid 102 and to optimize inverter power quality. The first phase shift is selected to make the covariance index between current phase shift from the anti-islanding algorithm 122 and voltage frequency from the frequency measurement module 114 distinct enough in islanding mode compared to the covariance index in grid-connection mode. The maximum phase shift introduced in the first phase shift is equal to or less than 6 degrees to optimize inverter power quality in grid connection mode. On the other hand, the second phase shift is selected to cause the frequency of the output voltage $V_{out}$ to fall reliably outside the OFP/UFP window in islanding mode.

Figure 3:
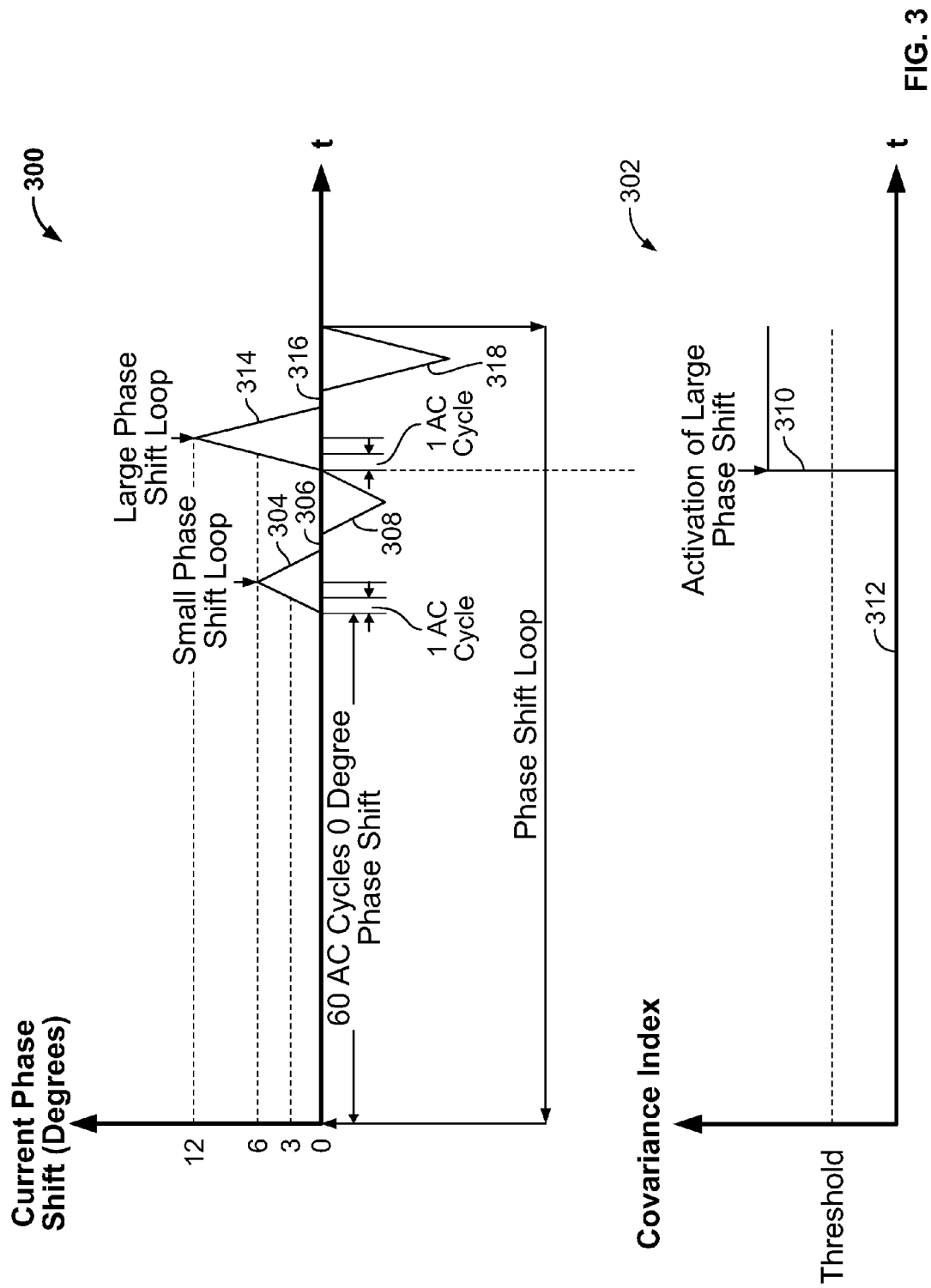
FIG. 3 illustrates two exemplary timing plots of current phase shifts and the corresponding covariance index according to an anti-islanding system of the present disclosure.

FIG. 3 illustrates an exemplary timing diagram that includes a current phase-shift plot 300 of the output current phase shift versus time and a covariance plot 302 of a covariance index versus time. Initially, the output current phase shift is zero degrees. The anti-islanding module 122 waits for 60 AC cycles then instructs the current controller 124 to introduce a first phase shift 304 in the output current $I_{out}$ of the inverter 106. The first phase shift 304 is preferably produced by a continuous function, such as a sinusoidal function. In this example, the first phase shift 304 has a wave peak and a slope rate. The wave peak is positive six degrees as shown, but in other implementations, can be positive five degrees. The slope rate is positive three degrees per cycle of the output current $I_{out}$ as shown, but in other implementations, can be positive 2.5 degrees per cycle of the output current. While varied continuously, the waveform of the first phase shift 304 resembles a triangular wave. The duration of the first phase shift 304 is four AC cycles. The current frequency is feedback-controlled by voltage frequency.

In some implementations, after introducing the first phase shift, a covariance index can be calculated as detailed below. Alternately, in the illustrated example, the anti-islanding module 122 instructs the current controller 124 to introduce in the output current a zero phase shift 306 for one AC cycle. Next, the anti-islanding module 122 instructs the current controller 124 to introduce a negative phase shift 308 in the output current $I_{out}$ of the inverter 106 having a duration of four AC cycles, a wave peak of −6 degrees, and a slope rate of −3 degrees per AC cycle. The negative phase shift 308 is a mirror-image of the first phase shift 304 having the same wave peak and slope rate as the wave peak and slope rate of the first phase shift 304. The small phase-shift loop comprising the first phase shift 304 and the negative phase shift 308 shifts the phase of the output current by +3, +6, +3, 0, −3, −6, −3 degrees, one AC cycle each.

Following this negative-going perturbation to the phase of the output current, the anti-islanding module 122 calculates the covariance index as described below. When the DG system 100 is in an islanding configuration and therefore disconnected from the electrical grid 102, the perturbations introduced by the phase shifts 304, 308 cause nearly instantaneously the frequency of the voltage output $V_{out}$ to deviate from nominal (e.g., 50 or 60 Hz). The covariance algorithm identifies this correlation between the output current phase shift and the voltage frequency by producing an index 310 that sharply deviates from the nominal index when the output current phase shift and voltage frequency do not track one another. The value of the index 310 can be 10-20 times greater than the value of the index when no perturbation is introduced during an islanding configuration. The anti-islanding module 122 determines whether the covariance index 310 exceeds a predefined threshold, discussed more fully below, and if so, instructs the current controller 124 to introduce a larger, positive second phase shift 314 in the output current $I_{out}$ of the inverter 106. The second phase shift 314 is preferably produced by a continuous function, such as a sinusoidal function. In this example, the second phase shift 314 has a wave peak and a slope rate. The wave peak is positive twelve degrees as shown, which is double the wave peak of the first phase shift 304. The slope rate is positive six degrees per cycle of the output current $I_{out}$ as shown, which is also double the slope rate of the first phase shift 304. While varied continuously, the waveform of the second phase shift 314 resembles a triangular wave. The duration of the second phase shift 314 is four AC cycles.

In the illustrated example, the anti-islanding module 122 instructs the current controller 124 to produce a zero-degree phase shift 316 in the output current for one AC cycle. Next, the anti-islanding module 122 instructs the current controller 124 to introduce a negative, continuously varying, phase shift 318 having a wave peak of −12 degrees and a slope rate of −6 degrees per cycle and a duration of four AC cycles. These larger perturbations cause the output voltage frequency to fall outside of the OFP/UFP window, thereby causing the inverter to trip or interrupt the flow of output current. The large phase-shift loop comprising the second phase shift 314 and the negative phase shift 318 shifts the phase of the output current by +6, +12, +6, 0, −6, −12, −6 degrees one AC cycle each. The phase shift in each AC cycle is evenly distributed.

If the covariance index does not exceed the threshold following the introduction of the first phase shift 304 and the negative phase shift 308, the anti-islanding module 122 reverts back to the beginning of the loop, waiting 60 AC cycles before introducing the next first phase shift. When the DG system 100 is connected to the electrical grid 102, these small perturbations to the output current will not cause the output voltage frequency to fall outside the OFP/UFP window of the inverter. The OFP/UFP window is specified in a grid interconnection code, which can vary by jurisdiction. In the United States, for example, the OFP/UFP window is specified in UL Standard 1741-1. Other jurisdictions have similar standards that specify the OFP/UFP limits. The OFP/UFP window is stored in the OFP/UFP module 108.

Figure 2:
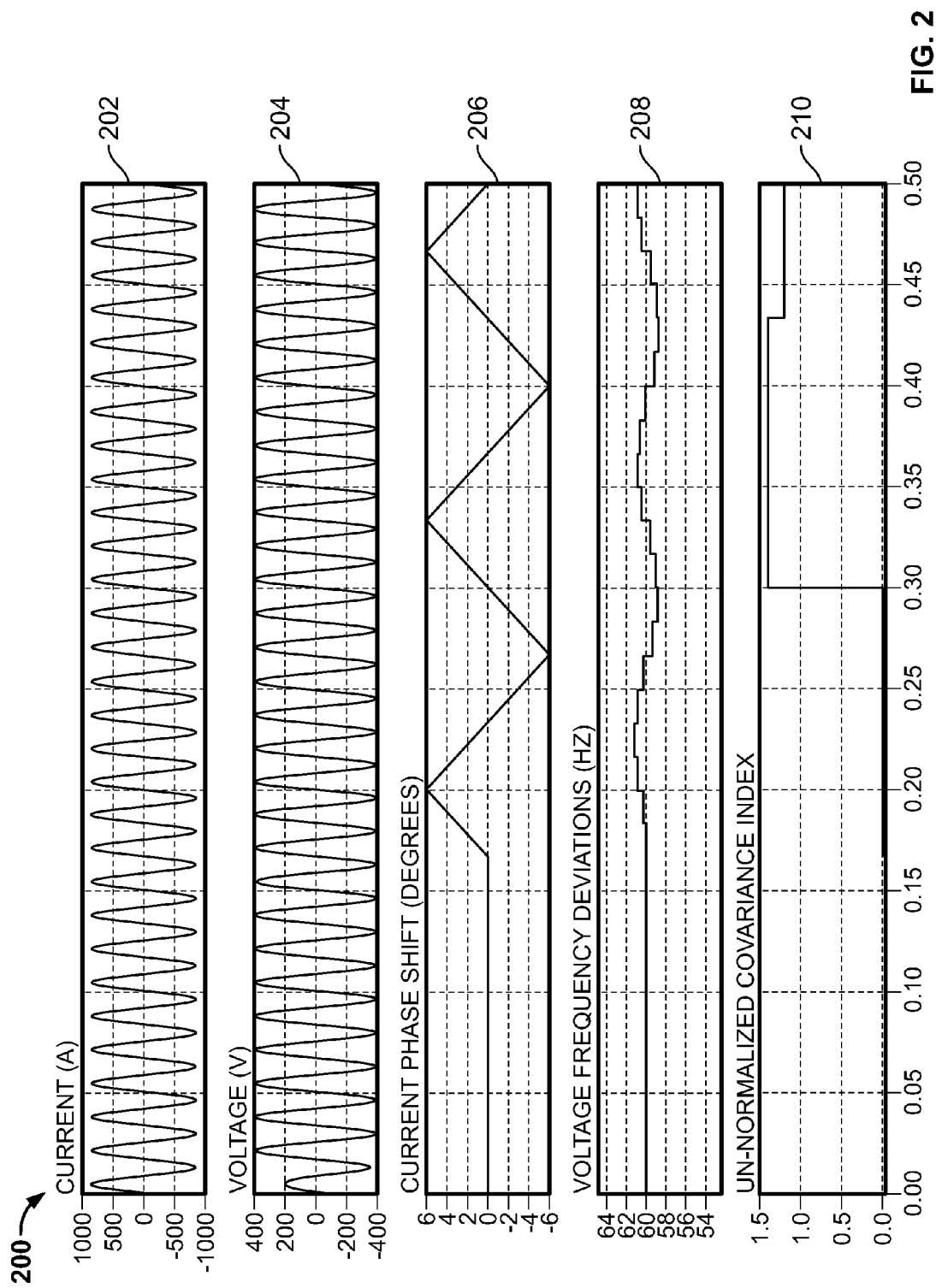
FIG. 2 are exemplary plots of waveforms involved in the anti-islanding system shown in FIG. 1.

The effect of shifting the phase of the output current on the output voltage frequency is illustrated in FIG. 2, which is a waveform plot 200 of various parameters in the DG system 100. The parameters include the output current 202 of the inverter 106, output voltage 204 of the inverter 106, the phase shift of the output current 206, the voltage frequency 208, and the un-normalized covariance index 210. In this example, the AC current source 108 produces current of 851 A at an initial frequency of 60 Hz. Initially, the current phase shift is zero. After 10 AC cycles, the current phase shift shaped as a triangular wave is introduced and the current frequency is also feed-back controlled by voltage frequency. The triangle wave peak is 6 degrees and its slope rate is 3 degrees/ac cycle as shown in FIG. 2. The un-normalized covariance index 210, which characterizes the correlation between the current phase shift and the voltage frequency, demonstrates this strong relationship after islanding.

The covariance of current phase shift and voltage frequency is defined as $$C_{\theta-f}(m) = E\{[\theta(n) - u_\theta] * [f(n+m) - u_f]\} \quad (1)$$

$$= \frac{1}{N}\sum_{n=1}^{N}[\theta(n) - u_\theta] * [f(n+m) - u_f]$$

Where:
θ(n)—inverter's output current phase shift;
$u_\theta$—mean value of θ(n);
f(n)—inverter's output voltage frequency;
$u_f$—mean value of f(n); and
m—sampling instant different from n.

Because an immediate impact on voltage frequency following a current phase shift is expected, the covariance value at m=0 is used to identify the correlation between the output current phase shift and the output voltage frequency:

$$C_{\theta-f}(m) = \frac{1}{N}\sum_{n=1}^{N}[\theta(n) - u_\theta] * [f(n+m) - u_f] \quad (2)$$

Besides, the mean value of θ(n) is equal to zero for a particularly selected phase shift shown in FIG. 2, which gives:

$$\frac{1}{N}\sum_{n=1}^{N}[\theta(n)] = 0 \quad (3)$$

Then Equation (2) is transformed to:

$$C_{\theta-f}(0) = \frac{1}{N}\sum_{n=1}^{N}[\theta(n)] * [f(n) - u_f] \quad (4)$$

$$= \frac{1}{N}\sum_{n=1}^{N}\{[\theta(n) * f(n)] - [\theta(n) * u_f]\}$$

$$= \frac{1}{N}\sum_{n=1}^{N}[\theta(n) * f(n)] - \frac{u_f}{N}\sum_{n=1}^{N}\theta(n)$$

$$= \frac{1}{N}\sum_{n=1}^{N}[\theta(n) * f(n)]$$

For the convenience of implementation, the absolute value of covariance is taken as the islanding index.

$$C_{\theta-f}(0)|_{abs} = ABS\left(\frac{1}{N}\sum_{n=1}^{N}[\theta(n) * f(n)]\right) \quad (5)$$

This islanding index is expected to be high in islanding conditions because of the correlated relationship between output current phase shift and output voltage frequency, but it will remain low in the grid-connected configuration because the grid frequency is independent of the current phase shift.

Aspects of the present disclosure use a small, well-patterned phase shift in the inverter's output current to try to slightly swing the output voltage frequency in an islanding configuration and compute the correlation or covariance index of the output current phase shift and the output voltage frequency movement. This covariance index becomes much more significant in an islanding configuration than in a grid-connected configuration in which the grid frequencies are independent of the phase shifts in the output current of the inverter. Once the covariance index exceeds a predefined threshold, a larger phase shift is induced in the output current of the inverter to guarantee a secure trip of the islanded inverter. The phase shift will return to normal (zero degrees) after one or more large phase shifts to maintain a minimum perturbation on the grid-connected operation.

Note that the selection of a triangle-shaped phase-shift pattern with zero mean value in a phase shift loop simplifies covariance computation and also helps to set the islanding index threshold easily without consideration of the nominal line frequency. Assuming a phase shift pattern in the output current is selected as +θ, +2θ, +θ, 0, -θ, -2θ, -θ, 0, then Equation (5) can be expressed as:

$$C_{\theta-f}(0)|_{abs} = ABS\left(\frac{1}{6}\sum_{n=1}^{6}[\theta(n) * f(n)]\right) \quad (6)$$

$$= ABS\left(\frac{1}{6}[\theta(1) * f(1) + \theta(2) * f(2) + \theta(3) * f(3) + \theta(4) * f(4) + \theta(5) * f(5) + \theta(6) * f(6)]\right)$$

$$= ABS\left(\frac{\theta}{6}\begin{array}{l}[f(4) - f(1) + f(6) - \\ f(3) + 2*(f(5) - f(2)]\end{array}\right)$$

In a grid-connected configuration, the grid frequency measurement can be expressed as:

$$f = f_{nominal} \pm \Delta f_m \pm \Delta f_u \quad (7)$$

Where:
$f_{nominal}$ is the grid nominal frequency;
$\Delta f_m$ is the absolute measurement accuracy; and
$\Delta f_u$ is the uncertainty of the grid frequency.

Considering the islanding index threshold as the maximum possible value of covariance in a grid-connected configuration, this threshold can be specified as:

$$C_{\theta-f(0)}|_{threshold} = ABS\left(\frac{\theta}{6}[8*(\Delta f_m + \Delta f_u)]\right) \quad (8)$$

In a practical DG system, it can be assumed that the accuracy of frequency measurement is less than 0.1 Hz and the uncertainty of the grid frequency is less than 0.05 Hz.

Figure 4:
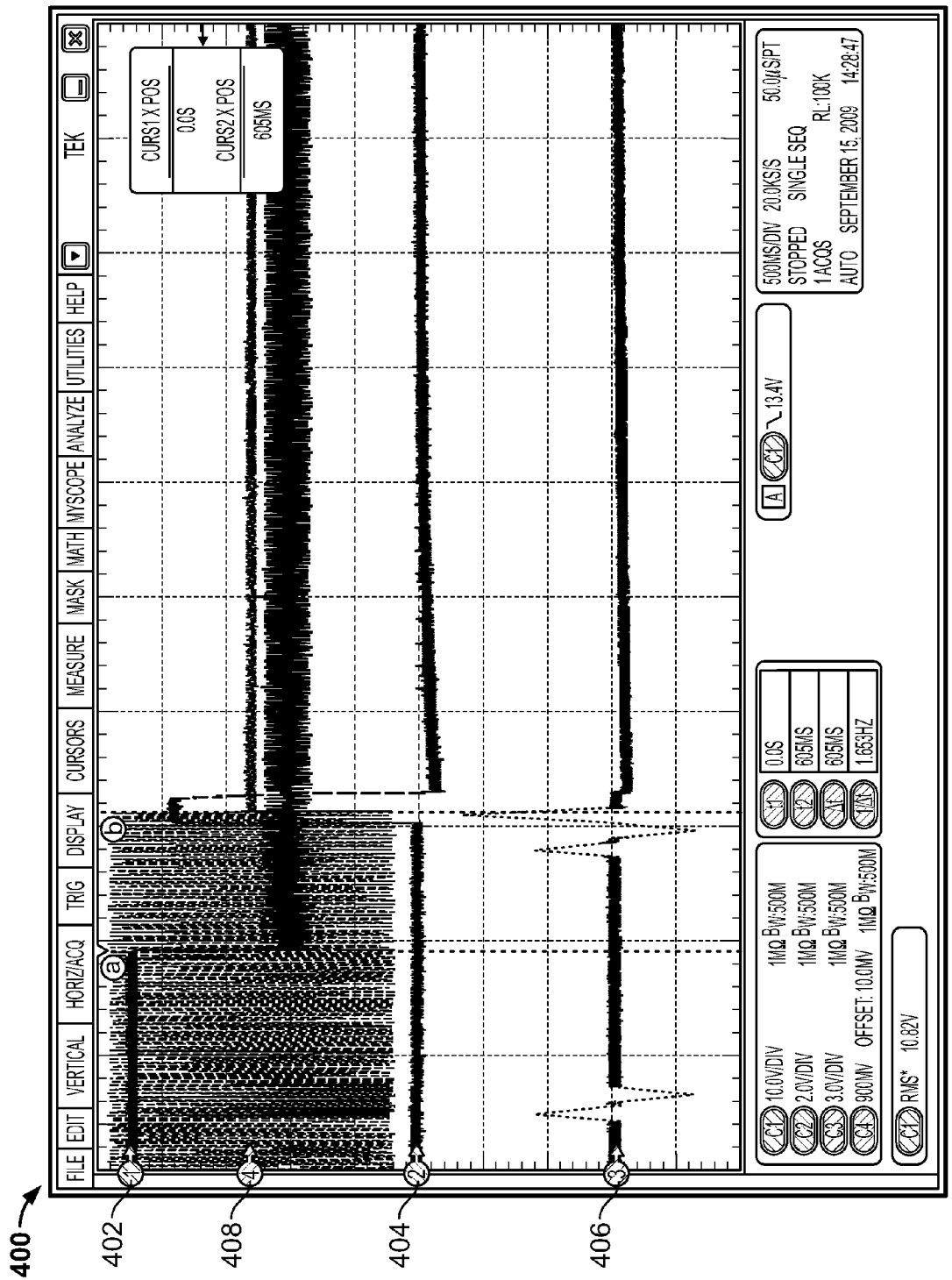
FIG. 4 are exemplary plots of waveforms captured during an implementation of the anti-islanding techniques disclosed herein.

FIG. 4 illustrates various plots showing the response of the inverter to the phase shifts produced by the current controller 124 under control of the anti-islanding algorithm 122. The anti-islanding algorithm 122 can be implemented in a GT500 kW-MV inverter available from Xantrex, for example. In this example, the inverter 106 is operated at 100% rated power and the islanding load 110 has a quality factor of 1. The output current of the inverter 106 is represented by the waveform 408, the waveform 402 represents a trigger signal indicating the beginning of an islanding configuration, the shift of the phase of the output current in degrees is represented by the waveform 406, and the un-normalized covariance index is represented by the waveform 404.

FIG. 4 solidly validates the anti-islanding algorithm 122. After islanding, a small phase shift loop leads to a high covariance (correlation) between the phase shifts in the output current and frequency shifts in the output voltage, activating the large phase shift loop, which causes the inverter to trip or interrupt the output current at over-frequency protection. The predefined threshold for the covariance index is carefully selected to avoid the large phase shift in a grid-connected configuration while guaranteeing a secure trip upon detection of an islanding configuration. Selection of the covariance threshold involves competing considerations including exciting the grid sufficiently to cause the output frequency to deviate from nominal and avoiding an adverse impact on the power quality of the inverter. If the threshold is set too low, the larger phase shifts will be introduced in the output current, adversely affecting power quality. If the threshold is set too high, the output current may not be sufficiently perturbed to cause the output frequency to shift outside of the OFP/UFP window or the inverter may fail to detect other conditions. The threshold should be set above the covariance index in a grid-connected configuration, but an exemplary threshold can be set at 0.5 or greater, when normalized to fall within a range of 0 to 1.

Figure 5:
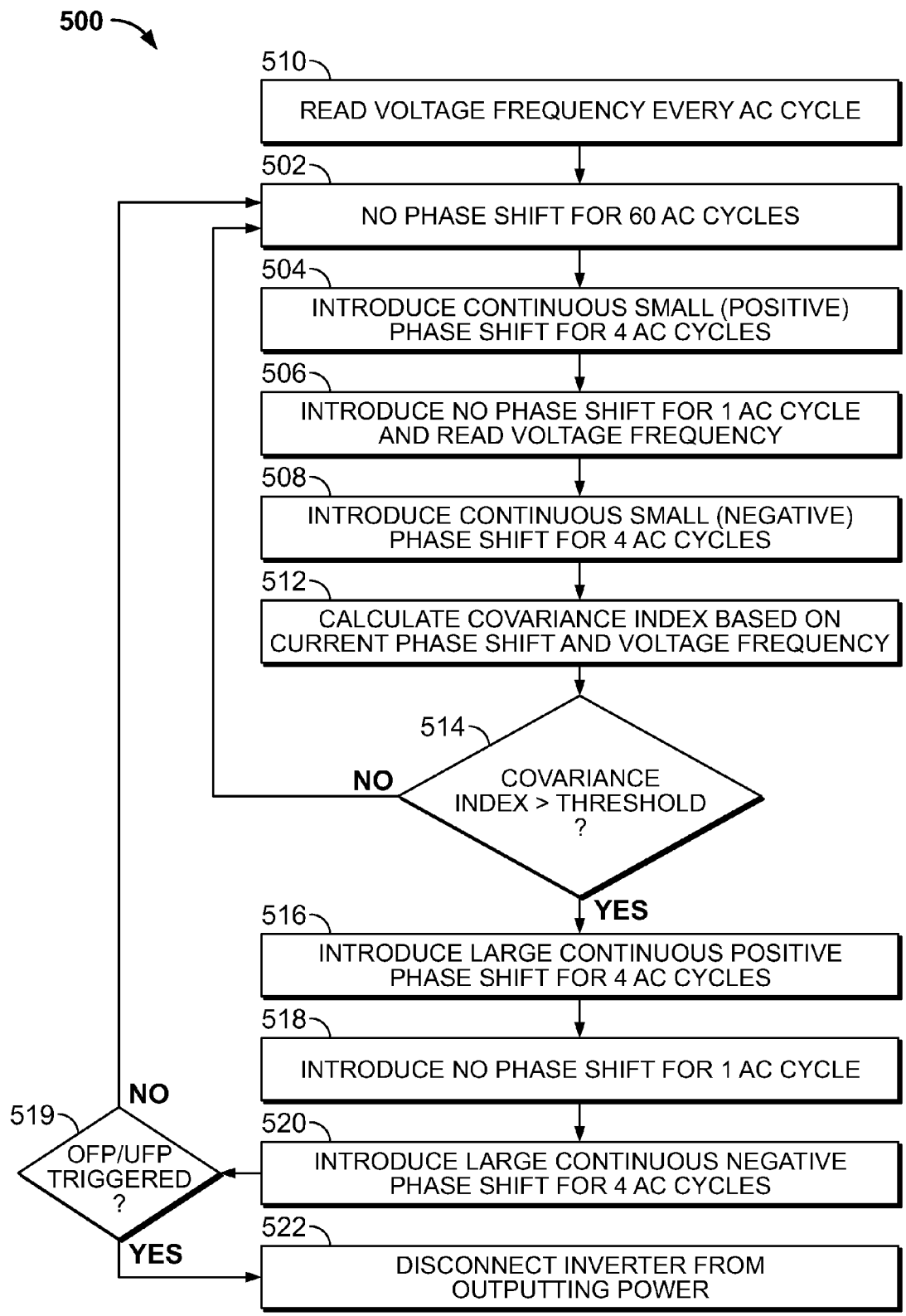
FIG. 5 is a flow chart diagram of an exemplary anti-islanding algorithm that can be carried out by the anti-islanding system shown in FIG. 1.

FIG. 5 is a flowchart of an exemplary algorithm 500 for anti-islanding the DG system 100 from the electrical grid 102. This algorithm 500 can correspond generally to the one or more controllers 112, or, for example, to the frequency measurement module 114, the anti-islanding algorithm 122, and/or the current controller 124 shown in FIG. 1. The output current phase shifts and corresponding covariance indices over time are illustrated in FIG. 3, described above. In a first loop, the algorithm 500 introduces no phase shift in the output current of the inverter 106 for 60 AC cycles (502). A small, continuous, positive phase-shift is introduced in the output current for 4 AC cycles (504). This can correspond to the first phase shift 304 shown in FIG. 3. The algorithm 500 introduces no phase shift for 0 AC cycles and the output voltage frequency is measured (506). A small, continuous, negative phase-shift is introduced in the output current for 4 AC cycles (508), and the voltage frequency is measured (510). The algorithm 500 calculates a covariance index based on the phase shift in the output current and the output voltage frequency of the inverter 106. The algorithm 500 determines whether the calculated covariance index exceeds a predefined threshold (514), and, if not, the algorithm 500 loops back to block 502 to begin another loop of introducing small perturbations into the output current.

If the covariance index exceeds the predefined threshold (514), the algorithm 500 enters a second loop by introducing a large, continuous, positive phase shift for four AC cycles (516) in the output current. No phase shift is introduced for one AC cycle (518), and the algorithm 500 introduces a large, continuous, negative phase shift for four AC cycles in the output current (520). The output voltage frequency is measured, and if it falls outside the OFP/UFP (519) protection window of the inverter 106 as determined by the OFP/UFP module 108, the inverter disconnects the power bridge 126, interrupting the flow of output current to the load 110, by opening the contactor 118. However, if the output voltage frequency is still inside the OFP/UFP (519) protection window, the anti-islanding algorithm 500 loops back to block 502 to restart small perturbations into the output current. The logic here is to prevent a nuisance trip caused by a possible power system transient.

The anti-islanding algorithm disclosed herein can provide a secure trip of an inverter in an islanding configuration and minimize the perturbation to the inverter's current output in the normal grid-connected configuration. An anti-islanding system and algorithm uses a covariance between the output current phase shift and the output voltage frequency variance as an islanding index. A smaller, smoothly varying current phase shift is introduced into the output current of the inverter to minimize the perturbation on the power quality and efficiency of the inverter. A logical phase shift loop guarantees reliable trip against islanding while maintain the minimum perturbation in inverter's normal operation.

Any of the algorithms disclosed herein include machine readable instructions for execution by: (a) a processor, (b) a controller, and/or (c) any other suitable processing device. It will be readily understood that the one or more controllers 112 and/or the current controller 124 includes such a suitable processing device. Any algorithm disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it can be implemented by an application specific integrated circuit (ASIC), a programmable logic device (PLD), a field programmable logic device (FPLD), discrete logic, etc.). Further, although specific algorithms are described with reference to flowcharts or functional block diagrams depicted herein, persons of ordinary skill in the art will readily appreciate that many other methods of implementing the example machine readable instructions can alternatively be used. For example, the order of execution of the blocks can be changed, and/or some of the blocks described can be changed, eliminated, or combined.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of anti-islanding a grid-connected distributed generation system from an electrical grid, comprising:
introducing a first phase shift in an output current of an inverter of the distributed generation system;
calculating a covariance between the phase shift of the output current and a frequency of an output voltage of the inverter;
responsive to the covariance exceeding a predefined threshold, introducing a second phase shift larger than the first phase shift in the output current of the inverter;
detecting a deviation in the output voltage frequency responsive to introducing the second phase shift; and
responsive to the detecting, causing the inverter to disconnect from a load connected to the inverter.

2. The method of claim 1, wherein the first phase shift is produced by a continuous function.

3. The method of claim 2, wherein the continuous function is a sinusoidal function.

4. The method of claim 2, wherein the first phase shift has a wave peak, a slope rate, and a duration, the wave peak of the first phase shift being at least 5 degrees, and wherein the slope rate of the first phase shift is at least 2.5 degrees per cycle of the output current.

5. The method of claim 2, wherein the second phase shift is produced by a continuous function.

6. The method of claim 5, wherein the second phase shift has a wave peak, a slope rate, and a duration, the wave peak of the second phase shift being at least double the wave peak of the first phase shift, and wherein the duration is four cycles of the output current.

7. The method of claim 5, wherein the slope rate of the second phase shift is twice the slope rate of the first phase shift.

8. The method of claim 7, wherein the wave peak of the second phase shift is at least twelve degrees, the slope rate of the second phase shift is at least six degrees per cycle of the output current, and the duration is four cycles of the output current.

9. The method of claim 1, wherein the detecting includes determining whether the deviation causes the output voltage frequency to fall outside of a frequency protection window of the inverter, wherein the detecting is carried out by a frequency detector of the inverter.

10. The method of claim 1, wherein the first phase shift is selected to cause the output voltage frequency to be within an over frequency protection or under frequency protection window associated with the inverter, and the second phase shift is selected to cause the output voltage frequency to fall outside an over frequency protection or under frequency protection window associated with the inverter.

11. The method of claim 1, wherein the calculating the covariance includes calculating an absolute value of the covariance to produce an islanding index indicative of a correlated relationship between the output current phase shift and the output voltage frequency.

12. The method of claim 11, wherein the islanding index is un-normalized, and wherein the predefined threshold exceeds 1.0.

13. The method of claim 1, further comprising:
prior to introducing the first phase shift, introducing no phase shift in the output current of the inverter for a predetermined number of cycles of the output current, the predetermined number of cycles corresponding to a time that is less than two seconds; and
responsive to the inverter being grid-connected to the distributed generation system, repeatedly introducing no phase shift in the output current then introducing the first phase shift in the output current until the covariance exceeds the predefined threshold.

14. The method of claim 13, wherein the predetermined number of cycles is 60.

15. A method of anti-islanding a grid-connected distributed generation system from an electrical grid, comprising:
shifting, by a phase generator of a grid-tied inverter, the phase of an output current of the inverter of the distributed generation system by a first phase shift in the output current;
calculating, by a controller, a correlation function that includes the first phase shift and a frequency of an output voltage of the inverter;
responsive to an output of the correlation function exceeding a threshold, the phase generator shifting the phase of the output current by a second phase shift that is greater than the first phase shift;
determining whether the output voltage frequency falls outside a frequency protection window of the inverter; and
responsive to the output voltage frequency falling outside the frequency protection window, causing the inverter to interrupt the output current to a load connected to the inverter.

16. The method of claim 15, wherein the first phase shift is shifted according a first continuous function and the second phase shift is shifted according to a second continuous function.

17. The method of claim 16, wherein the first continuous function is a sinusoidal function and the second continuous function is a sinusoidal function.

18. The method of claim 15, wherein the first phase shift lasts at least four cycles of the output current.

19. The method of claim 15, wherein the first phase shift has a wave peak causes the output voltage frequency to remain within the frequency protection window when the inverter is connected to the electrical grid.

20. The method of claim 15, wherein the second phase shift has a wave peak that causes the output voltage frequency to fall outside the frequency protection window when the distributed generation system is islanded from the electrical grid.

* * * * *